UNITED STATES PATENT OFFICE.

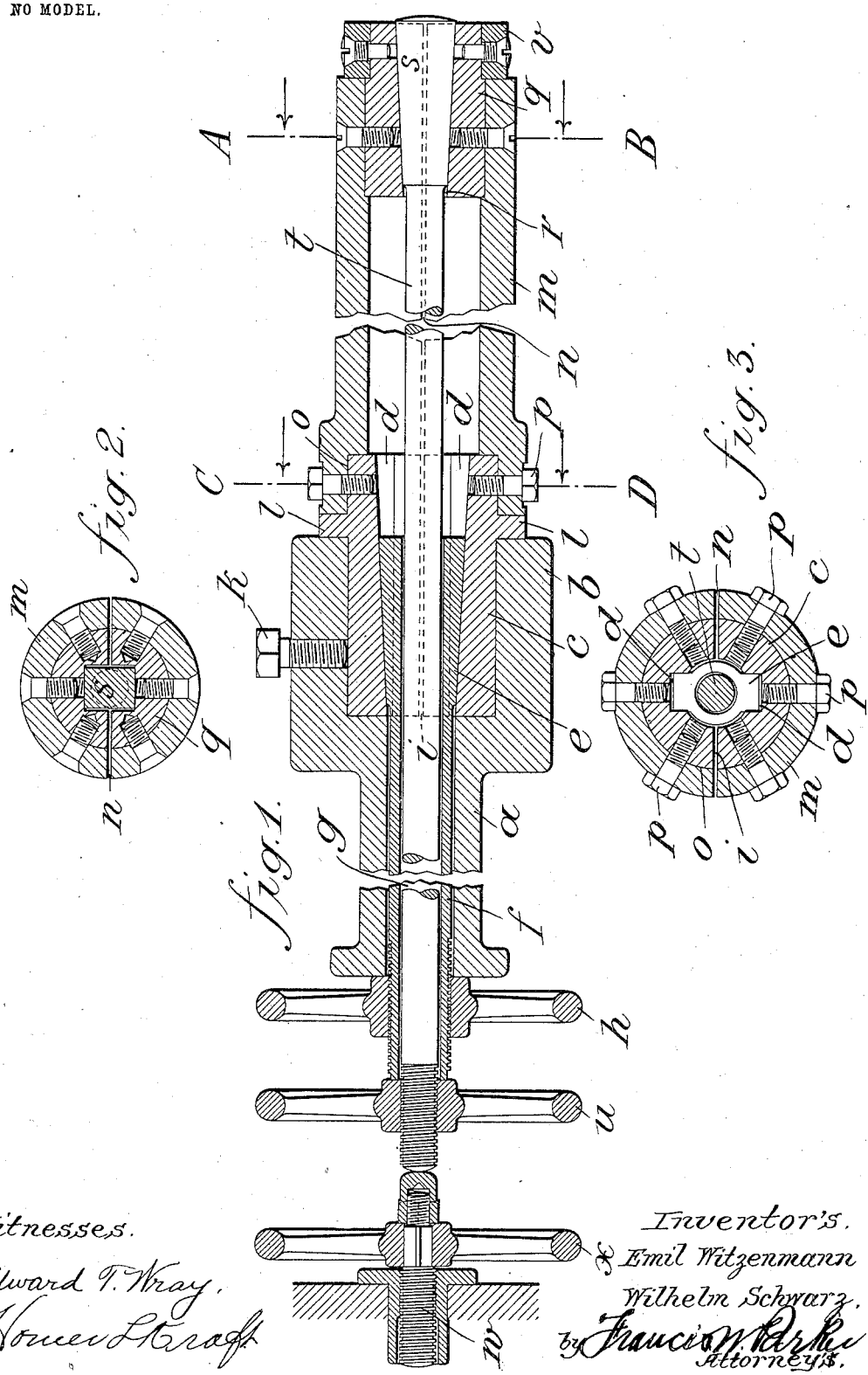

EMIL WITZENMANN AND WILHELM SCHWARZ, OF PFORZHEIM, GERMANY.

DEVICE FOR WINDING METALLIC SPIRAL HOSE.

SPECIFICATION forming part of Letters Patent No. 726,488, dated April 28, 1903.

Application filed April 3, 1902. Serial No. 101,176. (No model.)

*To all whom it may concern:*

Be it known that we, EMIL WITZENMANN and WILHELM SCHWARZ, of Pforzheim, Germany, have invented certain new and useful Improvements in Devices for Winding Metallic Spiral Hose, of which the following is a specification.

Hitherto it has been the practice to manufacture metallic spiral hose by winding it on a solid mandrel. After a portion of hose is ready wound on such a mandrel the former must in order to remove it from the mandrel (or in the event of a long hose being manufactured on the mandrel in order that a part of the finished hose may be drawn off) be to a certain extent turned in a direction opposite to the winding direction, so as to loosen it and overcome the adherence of the inner surface of the hose to the surface of the mandrel.

The present invention relates to an improved mandrel split longitudinally in one or more planes, its parts, moreover, being capable of being approached to one another radially of the mandrel-axis. The hose is wound on this mandrel when the individual parts composing it are at their maximum distance from each other. When the hose is wound on, these parts are approached to one another, whereby the surface of the mandrel is removed from the inner surface of the hose, so that the latter can be readily drawn off the mandrel.

On the accompanying drawings, Figure 1 is a longitudinal section of one form of the new mandrel for winding metallic hose. Fig. 2 shows a cross-section taken on the line A B of Fig. 1, and Fig. 3 is a like section taken on the line C D of Fig. 1.

An axially-bored mandrel $a$ is rotatably mounted in a kind of head-stock. (Not shown on the drawings.) The mandrel may be rotated in any well-known manner by a belt-pulley or the like. At the front end of this mandrel $a$ a chuck or head $b$ is secured, into which a split socket $c$, consisting of two or more parts, is inserted. This split socket is grooved to receive a wedge $e$, having a prolongation in the form of a spindle $f$. The wedge $e$ and spindle $f$ are bored throughout their entire length at $g$. The end of the spindle $f$ projects beyond the rear end of the mandrel $a$ and is at this end provided with a screw-thread adapted to receive a hand-wheel $h$, the boss of which is provided with an internal screw-thread and butts against the rear end of the mandrel $a$. By rotating the hand-wheel $h$ so as to bring it against the mandrel $a$ the wedge $e$ is drawn into the split socket $c$ in the direction of the hand-wheel $h$ and forces the parts composing the socket $c$ apart, so that the cylindrical outer surface of the said socket $c$ is pressed against the bore of the chuck $b$. In this manner spaces $i$ will be formed between the individual parts of the socket $c$. For the purpose of better holding the parts of the socket $c$ screws $k$ can also be employed. The end of the split socket $c$ projecting from the chuck $b$ is provided with a collar $l$.

The winding-mandrel proper, $m$, consists of two or more parts separated in longitudinal direction by a slit $n$. This mandrel $m$ is bored axially and provided with a shoulder and an internal recess at one end which so embraces the projecting end of the split socket $c$ that the cross-section of the split mandrel is circular. The parts of the mandrel $m$ are secured by screws $p$ to the corresponding parts of the socket $c$. The front end of the mandrel $m$ is closed by a plug $q$, split to correspond with the mandrel and bored with a pyramidal hole $r$. Into this hole fits a wedge $s$ at one end of the spindle $t$, which passes through the mandrel $m$, socket $c$, wedge $e$, and spindle $f$. This spindle $t$ is furnished with a screw-thread at that end which projects from the spindle $f$ and receives a hand-wheel $u$, the boss of which is provided with a female thread and can be screwed against the end of the hollow spindle $f$. By rotation of the hand-wheel $u$ in one direction the wedge $s$ will be drawn upon and force the parts of the front end of the mandrel $m$ apart. The extent to which the parts are thus forced open is, however, limited by means of a solid collar $v$, so that the mandrel $m$ remains cylindrical throughout its entire length. After the mandrel $m$ has in this manner been secured in the chuck $b$ the metallic hose is wound on it in the ordinary manner.

In order to remove the metal hose, when ready wound, from the mandrel $m$, the separate parts composing the latter must be retracted, so that the diameter of the mandrel is diminished. This is done by loosening the wedges $e$ and $s$ and approaching the separate parts of the spindle $m$. The wedges $e$ and $s$ are loosened by turning back the hand-wheels $h$ and $u$, so that their bosses no longer butt against the ends of the mandrel $a$ and spindle $f$, respectively. In order to be able to retract the wedges from their holes $d$ and $r$, a certain amount of force is necessary. This is exerted by means of a screw $w$, which works in line with the spindle $t$ and presses against the rear end of the latter, being turned by means of a hand-wheel $x$ for the purpose of loosening the spindles $t$ and $f$. After the wedges have been thus loosened the separate parts of the mandrel $m$ can be brought close to one another and the finished metallic spiral drawn from it.

Having now particularly described our invention, what we claim as new, and desire to secure by Letters Patent, is—

1. A device for winding metallic spiral hose, comprising a rotatable split hollow mandrel, a hollow spindle provided with a hollow wedge-shaped head engaging internally with one end of said mandrel so as to expand it, a spindle passing through said hollow spindle and mandrel and provided with a wedge-shaped head engaging internally with the other end of said mandrel, means for guiding and for reciprocating said spindles and means for limiting the extent of expansion of said mandrel, all substantially as described.

2. A device for winding metallic spiral hose, comprising a rotatable split hollow mandrel, a hollow spindle provided with a hollow wedge-shaped head engaging internally with one end of said mandrel so as to expand it, a spindle passing through said hollow spindle and mandrel and provided with a wedge-shaped head engaging internally with the other end of said mandrel, a rotatably-mounted cylindrical part embracing and guiding said spindles and having a head to receive one end of said mandrel, means for reciprocating said spindles and means for limiting the extent of expansion of said mandrel, all substantially as described.

3. A device for winding metallic spiral hose, comprising a rotatable split hollow mandrel, a hollow spindle having a screw-thread on its rear end, provided with a hollow wedge-shaped head engaging internally with one end of said mandrel so as to expand it, a spindle having a screw-thread on its rear end passing through said hollow spindle and mandrel and provided with a wedge-shaped head engaging internally with the other end of said mandrel, a rotatably-mounted cylindrical part embracing and guiding said spindles and having a head to receive one end of said mandrel, hand-wheels having internally-threaded bosses working on the threaded ends of said spindles and drawing upon the same and means for limiting the extent of expansion of said mandrel, all substantially as described.

4. A device for winding metallic spiral hose, comprising a rotatable split hollow mandrel, a hollow spindle having a screw-thread on its rear end provided with a hollow wedge-shaped head, a spindle having a screw-thread on its rear end passing through said hollow spindle and mandrel and provided with a wedge-shaped head, a rotatably-mounted cylindrical part embracing and guiding said spindles and having a recessed head, a split socket held in said head and adjustably connected to one end of said mandrel and adapted to receive the wedge-shaped end of said hollow spindle, a split plug at the end of said mandrel adapted to receive the wedged head of said innermost spindle a solid ring embracing said plug, hand-wheels having internally-threaded bosses working on the threaded ends of said spindles and drawing upon the same, a screw-spindle turning in a stationary bearing, a hand-wheel mounted on said screw-spindle and reciprocating it so as to butt against said innermost spindle rear end all substantially as described.

Signed at Stuttgart, Würtemberg, this 13th day of March, 1902.

EMIL WITZENMANN.
WILHELM SCHWARZ.

Witnesses:
WM. HAHN,
ERNST ENTEINNARD.